(12) United States Patent
Bumbulis

(10) Patent No.: US 9,990,510 B2
(45) Date of Patent: Jun. 5, 2018

(54) DATABASE LOGGING USING STORAGE CLASS MEMORY

(71) Applicant: Sybase, Inc., Dublin, CA (US)

(72) Inventor: Peter Bumbulis, Cambridge (CA)

(73) Assignee: Sybase, Inc., Dublin, CA (US)

( * ) Notice: Subject to any disclaimer, the term of this patent is extended or adjusted under 35 U.S.C. 154(b) by 208 days.

(21) Appl. No.: 14/789,907

(22) Filed: Jul. 1, 2015

(65) Prior Publication Data
US 2017/0004317 A1    Jan. 5, 2017

(51) Int. Cl.
*G06F 17/30* (2006.01)
*G06F 21/62* (2013.01)
*G06F 12/0802* (2016.01)

(52) U.S. Cl.
CPC ...... *G06F 21/6218* (2013.01); *G06F 12/0802* (2013.01); *G06F 17/30289* (2013.01); *G06F 2212/603* (2013.01)

(58) Field of Classification Search
CPC ........... G06F 17/3007; G06F 17/30289; G06F 17/30; G06F 17/30151; G06F 17/30097
USPC ................................................. 707/600–899
See application file for complete search history.

(56) References Cited

U.S. PATENT DOCUMENTS

2002/0116356 A1\* 8/2002 Ieong ................ G06F 17/30578

OTHER PUBLICATIONS

Bailey, K.A. et al. "Exploring Storage Class Memory with Key Value Stores". *INFLOW '13: Proceedings of the 1st Workshop on Interactions of NVM/FLASH with Operating Systems and Workloads*. Nov. 3, 2013.Pennsylvannia, USA. ACM 978-1-4503-2462-5.
Fang, R. et al. "High Performance Database Logging using Storage Class Memory". *2011 IEEE 27th International Conference on Data Engineering (ICDE)*. ICDE Conference 2011:1221-1231. 978-1-4244-8960-2/11.
Volos, H. et al. "Mnemosyne: Lightweight Persistent Memory." *ASPLOS '11*. Mar. 5-11, 2011. Newport Beach, California. USA. (Mar. 2011). ACM 978-1-4503-0266-1/11/03.

\* cited by examiner

*Primary Examiner* — Isaac M Woo
(74) *Attorney, Agent, or Firm* — Mintz Levin Cohn Ferris Glovsky and Popeo, P.C.

(57) ABSTRACT

A plurality of reserve and commit log operations are initiated in a database system. Thereafter, at least a portion of the database operations are logged in a log such that transient data structures are kept in-memory of the database system and persistent data structures are kept in byte-addressable memory. Next, each of one or more clients concurrently accessing the log are registered to enable such clients to access the log.

19 Claims, 2 Drawing Sheets

DATABASE LOGGING USING STORAGE CLASS MEMORY

TECHNICAL FIELD

The subject matter described herein relates the detection of valid and invalid accesses to shared data structures by threads of a multithreaded program.

BACKGROUND

Database management systems utilize logs to make durable operations performed in connection with stored records. Such operations can be performed by clients that concurrently access the database. Techniques can be implemented to allow clients to concurrently update the log. Clients reserve log space so that tentative changes can be made. These tentative changes can be subsequently made permanent through commits. The log can later be used as part of a restart or redo operation to recover or otherwise recreate aspects of the records upon a failure or other database issue. The various reserve and commit operations and the restart/redo operations can sometimes hamper overall database performance given the need for repeated concurrent access to such persistence.

SUMMARY

In one aspect, a plurality of reserve and commit log operations are initiated in a database system. Thereafter, at least a portion of the database operations are logged in a log such that transient data structures are kept in-memory of the database system and persistent data structures are kept in byte-addressable memory. Next, each of one or more clients concurrently accessing the log are registered to enable such at least two clients to access the log.

The transient data structures can be stored in dynamic random access memory (DRAM). The byte-addressable memory can form part of storage class memory (SCM).

For each reserve operation, the database system can return a pointer to a log record having a requested size. For each commit operation, subsequent to a client filling in records reserved via a reserve operation, the database system makes the corresponding log records available in an order in which they were reserved.

Registration of the concurrent clients can be limited so that they do not exceed a number of available hardware execution contexts.

The persistent data structures can include a contiguous buffer to hold log records in the log, a count of registered clients, and an array of client descriptors. Each client descriptor can include a pointer to a last committed log record for the corresponding client and a total amount of data committed by such client. The total amount of data committed by the client can include a number of consumed bytes and/or cache lines. The transient data structures can include a pointer to a first unused byte in the buffer and a copy of the client descriptors. As part of the operations and prior to commit, only the client descriptors in the transient data structures can be modified and the corresponding copies of the client descriptors in the persistent data structures can be modified upon commit.

The log can be characterized as clean if there are no registered clients. In addition, log records forming part of the log each can include a header that indicates whether the corresponding log record was committed. The log can be characterized as dirty if there are registered clients. With this scenario, each header of a dirty log record can point to a previous log record for the corresponding client.

The reserving operations can include reserving a log entry by comparing and swapping a corresponding log tail. The reserving operations can include filling, for each record, a header with a corresponding record size and a pointer for a previous log record for the corresponding client, updating, for each log record, the copy of the corresponding client descriptor in the transient data structure with an amount of reserved space and a pointer to reserved record, and returning the reserved record to the corresponding client.

The committing can include forcing client data to the persistent data structures.

A restart operation can be initiated by making committed log records available in an order in which they were reserved.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The current subject matter provides many technical advantages. For example, the current subject matter provides techniques that provide for more rapid logging and restart operations as compared to approaches that utilize traditional persistence.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
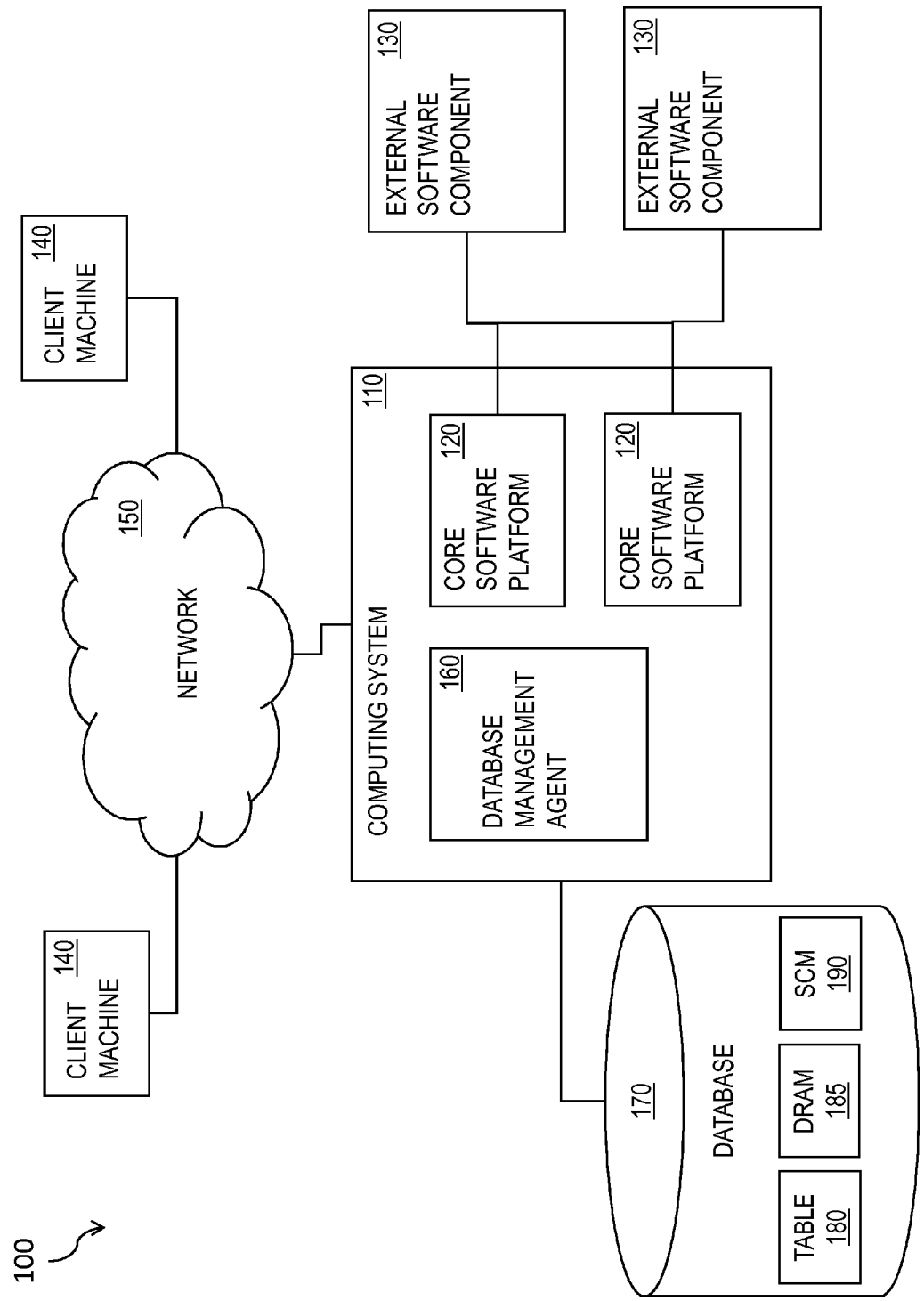
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 (sometimes simply referred to as a database) that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like). The database management system 170 can include at least one table 180 and additionally include parallelization features consistent with those described herein. As will be described below in further detail, the database management system 170 can include random-access memory such as DRAM 185 and byte-addressable memory such as storage class memory (SCM) 190. The SCM 190 is advantageous in that it enables persistence similar to traditional hard drives but provides performance similar that of DRAM. The SCM 190 can take many forms including, without limitation, next generation FLASH, FeRAM (ferroelectric RAM), MRAM (magnetic RAM), RRAM (resistive RAM), solid electrolyte, PC-RAM (phase-change RAM).

The current subject matter provides a concurrent log implementation that is usable on current processors and takes advantage of the byte-addressable persistent nature of storage class memory (SCM) memory for improved performance. Clients can initiate two operations: reserve and commit. As part of a reserve operation, the database returns a pointer to a log record of the requested size. Clients fill in the reserved records in whatever manner is convenient. After logging one or more records in this fashion, a client can perform a commit. When the commit finishes, the client is guaranteed that upon restart, the committed log records will be made available in the order that they were reserved.

Before using the log, each concurrent client must register with the log. In some variations, the number of concurrent clients can be limited so that they do not exceed the number of available hardware execution contexts (e.g., processor cores, etc.).

The log can comprise both transient and persistent data structures. Transient data structures can be kept in-memory (e.g., DRAM, etc.) for performance while persistent data structures can be kept in SCM for durability.

The persistent data structures can comprise a contiguous buffer to hold the log records, the count of registered clients and an array of client descriptors. Each client descriptor can include a pointer to the last committed log record for the corresponding client and the total amount of data committed by that client. The total amount of data can be bytes and/or cache lines (not records).

The transient data structures can comprise a pointer to the first unused byte in the buffer (the tail of the log) and a copy of the client descriptors. Typically only the in-memory copy of the descriptors is modified; the persistent copy is only updated on commit. A log is said to be clean if there are no registered clients and dirty otherwise. Log records can contain, in addition to user data, a header that comprises the size of the log record and a field that (i) in a dirty log points to the previous log record for that client, and (ii) in a clean log simply indicates whether the log record was committed or not.

Reserving a log entry can comprise a compare and swap of the log tail. This, in some variations, can be the only point of synchronization in the entire algorithm: all other operations are thread local. After reservation, the header can be filled in with the record size (in bytes or cache lines) and a pointer to the previous log record for that client. After updating the in-memory copy of the client descriptor with the amount of space reserved and a pointer the newly reserved record, the record can be returned to the user.

Committing consists of ensuring that the client data has been forced to SCM (this can be done either by burdening clients with this responsibility, by having a write-through policy for the persistent memory for the log, or by explicitly forcing cached data to memory) and then copying the in-memory descriptor to persistent memory. The client data can be forced to SCM, in some variations, by having a write-through policy for the persistent memory for the log. In other variations, the cached client data can be explicitly forced to memory.

On restart, the committed log records can be made available in the order that they were reserved. The difficulty is that the storage for log records that have been reserved but not committed can contain arbitrary data. With such cases, the log can be first cleaned by identifying all holes in the log that contain uncommitted data and writing headers for such holes that specify the size of the hole and a marker that indicates that it does not contain committed data.

From the persisted active client descriptors, the total amount of committed data and the amount of space used in the log (up to and including the last committed record) can be calculated. The difference between the two is the total amount of uncommitted data that is to be identified. This number is decremented during cleaning until it reaches zero (indicating that cleaning is finished).

The log can be cleaned by going through the committed records backwards. This cleaning is possible because, for each active client, there is a pointer to its last committed record, and the committed records are threaded backwards by client. For each backwards step, it can be calculated if there is a gap between the current and previous records. If there is a gap, it can be marked as a hole (as described above) and then the uncommitted data count can be decremented. When this value goes to 0, the process is finished.

The log can be marked as clean simply by setting the persisted active client count to 0. In addition, the log tail can also be persisted.

Figure 2:
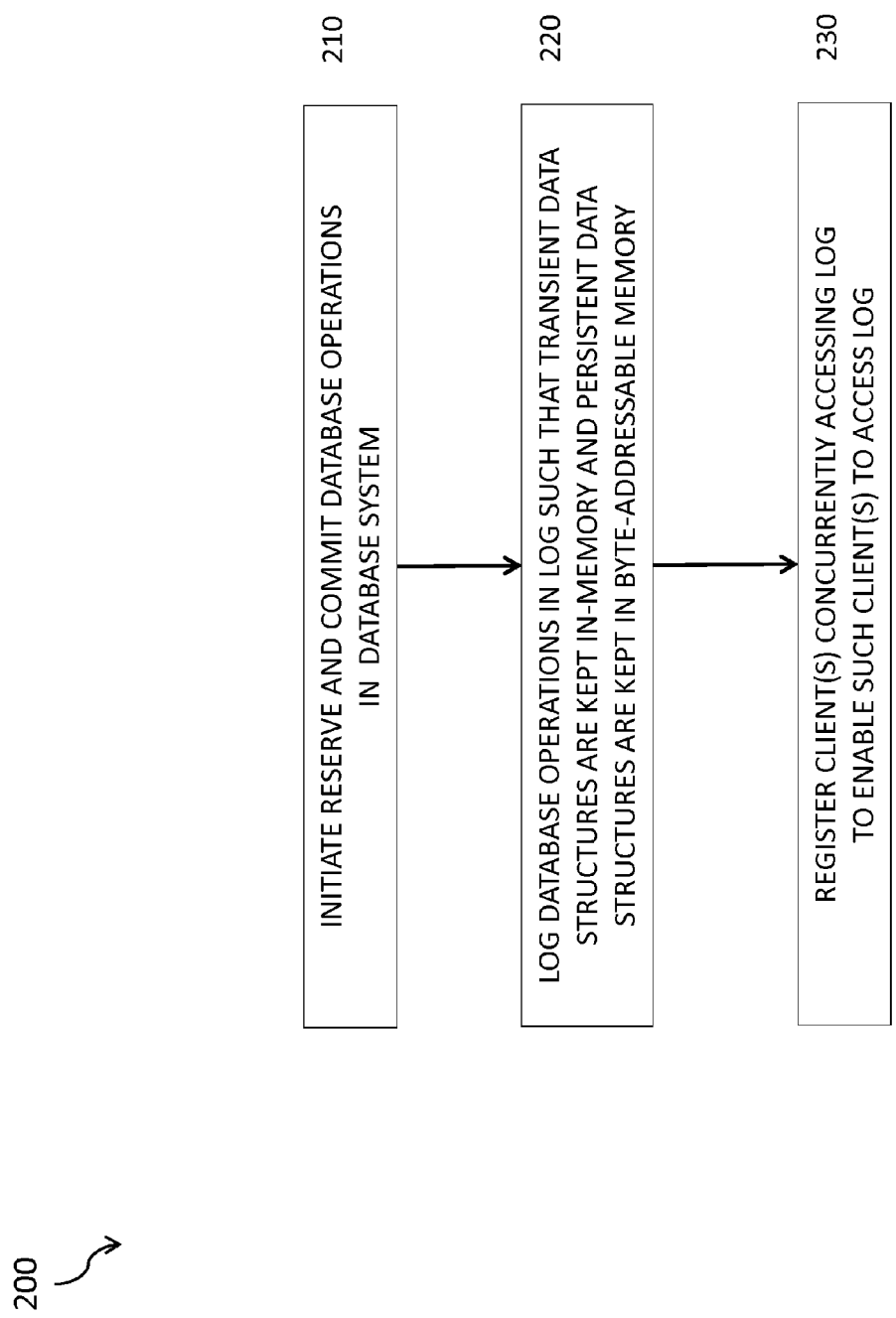
FIG. 2 is a process flow diagram illustrating database logging using in-memory technology in combination with byte-addressable memory.

FIG. 2 is a process flow diagram 200 in which, at 210, a plurality of reserve and commit database operations in a database system is initiated. Subsequently, at 220, at least a portion of the database operations are logged in a log such that transient data structures are kept in-memory of the database system and persistent data structures are kept in byte-addressable memory. Next, at 230, each of one or more clients concurrently accessing the log are registered to enable such clients to access the log.

Enclosed herein is a software appendix which provides sample code for implementing the subject matter described herein. This software appendix is fully incorporated herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

---

SOFTWARE APPENDIX

```
#include <iostream>
#include <thread>
#include <cstddef>
#include <atomic>
#include <array>
#include <queue>
#include <chrono>
#include <functional>
#include <boost/interprocess/offset_ptr.hpp>
```

SOFTWARE APPENDIX

```
#include <boost/interprocess/file_mapping.hpp>
#include <boost/interprocess/mapped_region.hpp>
using namespace boost::interprocess;
// #define __declspec(x)
#define __attribute__(x)
__declspec(align(64)) struct cache_line_t {
    char bytes[64];
    void flush( ) const {
        // region.flush(offset, size)
        ;
    }
    cache_line_t& store(const cache_line_t& other) {
        *this = other;
        return *this;
    }
    cache_line_t& zero( ) {
        memset(bytes, 0, sizeof(bytes));
        return *this;
    }
} __attribute__((aligned(64)));
union LogEntry {
    struct {
        size_t size; // in LogEntry chunks
        size_t next;
        char payload[0];
    };
    cache_line_t cl;
};
union LogStream {
    struct {
        size_t first;
        size_t committed;
    };
    cache_line_t cl;
};
union LogHeader {
    struct {
        size_t max_entries;
        std::atomic_size_t global_tail;
        std::atomic_size_t global_head;
        offset_ptr<LogEntry> entries;
        size_t max_streams;
        std::atomic_size_t cur_streams;
        offset_ptr<LogStream> streams;
    };
    cache_line_t cl;
};
class NVLogIter;
class NVLog {
    friend class NVLogIter;
    typedef NVLogIter iterator;
public:
    typedef size_t stream_id_t;
    typedef size_t log_offset_t;
    NVLog(void * address, size_t size)
        : m_nv_header(* (LogHeader *) address)
    {
        if (sizeof(m_nv_header) > size) {
            throw std::exception("memory region too small");
        }
        if(m_nv_header.max_entries == 0 ) {
            // Need to initialize
            auto max_streams = std::thread::hardware_concurrency( );
            m_nv_header.max_streams = max_streams;
            m_nv_header.cur_streams = 0;
            auto streams = (LogStream *) &(&m_nv_header)[1];
            m_nv_header.streams = streams;
            auto entries = (LogEntry *) &streams[max_streams];
            m_nv_header.entries = entries;
            m_nv_header.global_tail = 0;
```

SOFTWARE APPENDIX

```
            m_nv_header.global_head = 0;
            size_t used = (char *) entries - (char *) address;
            if (used > size) {
                throw std::exception("memory region too small");
            }
            m_nv_header.max_entries = (size -
used)/sizeof(entries[0]);
        }
        m_nv_streams = m_nv_header.streams.get( );
        m_nv_entries = m_nv_header.entries.get( );
        if(m_nv_header.cur_streams == 0) {
            // No recovery required
            m_global_tail = m_nv_header.global_tail.load( );
            m_global_head = m_nv_header.global_head.load( );
        } else {
            recover( );
        }
        for(auto i = 0; i < m_nv_header.cur_streams; ++i) {
            auto & stream = m_nv_streams[i];
            stream.cl.zero( );
            stream.first = -1;
            stream.cl.flush( );
        }
        m_streams = new LogStream[m_nv_header.max_streams];
    }
    ~NVLog( )
    {
        delete [ ] m_streams;
    }
    class Stream {
        public:
            Stream(NVLog& log, stream_id_t id)
                : m_log(log)
                , m_id(id)
            {
            };
            void *reserve(size_t needed) {
                auto size = (offsetof(LogEntry,
payload)+needed+sizeof(LogEntry)-1)/sizeof(LogEntry);
                auto head =
std::atomic_fetch_add(&m_log.m_global_head, size);
                auto &entry = m_log.m_nv_entries[head];
                auto &stream = m_log.m_streams[m_id];
                entry.next = stream.first;
                entry.size = size;
                stream.first = head;
                stream.committed += size;
                return entry.payload;
            }
            void commit( )
            {
m_log.m_nv_streams[m_id].cl.store(m_log.m_streams[m_id].cl).flush( );
            }
            ~Stream( )
            {
            };
        private:
            NVLog& m_log;
            stream_id_t m_id;
    };
    Stream mk_stream( )
    {
        // TODO respect limits
        stream_id_t id =
std::atomic_fetch_add(&m_nv_header.cur_streams, (size_t)1);
        m_nv_header.cl.flush( );
        m_streams[id] = m_nv_streams[id];
        return Stream(*this, id);
    }
    void recover( )
    {
        std::priority_queue<log_offset_t, std::vector<log_offset_t>,
                          std::greater<log_offset_t> > pq;
        log_offset_t accounted = 0;
```

SOFTWARE APPENDIX

```
            for (size_t i = 0; i < m_nv_header.cur_streams; ++i) {
                const LogStream& s = m_nv_streams[i];
                if (s.committed) {
                    accounted += s.committed;
                    pq.emplace(s.first);
                }
            }
            m_global_head = 0;
            if(accounted) {
                auto previous_min = extent(pq.top( ));
                m_global_head = previous_min;
                auto unaccounted = m_global_head - accounted;
                while(unaccounted) {
                    auto index = pq.top( );
                    pq.pop( );
                    log_offset_t current_max;
                    if(index == m_global_tail) {
                        current_max = m_global_tail;
                    } else {
                        pq.emplace(m_nv_entries[index].next);
                        current_max = extent (index);
                    }
                    auto gap = previous_min - current_max;
                    if (gap) {
                        // found a hole
                        auto &hole = m_nv_entries[current_max];
                        hole.size = gap;
                        hole.next = -2; // Sentinel to distinguish
                        hole.cl.flush( );
                        unaccounted -= gap;
                    }
                    previous_min = index;
                }
            }
            LogHeader header;
            header.cl = m_nv_header.cl;
            header.cur_streams = 0;
            header.global_head = m_global_head.load( );
            m_nv_header.cl.store(header.cl).flush( );
        }
        iterator begin( );
        iterator end( );
    private:
        log_offset_t extent(log_offset_t start) const
        {
            return start + m_nv_entries[start].size;
        }
        LogHeader& m_nv_header;
        LogEntry * m_nv_entries;
        LogStream * m_nv_streams;
        LogStream * m_streams;
        std::atomic_size_t m_global_head;
        std::atomic_size_t m_global_tail;
};
class NVLogIter {
    public:
        NVLogIter (NVLog const& log, NVLog::log_offset_t offset)
            : m_log(log)
            , m_offset(offset)
        {
        }
        LogEntry & operator*( )
        {
            return m_log.m_nv_entries[m_offset];
        }
        bool operator==(NVLogIter const& other) const
        {
            return (&m_log == &other.m_log) && (m_offset ==
other.m_offset);
        }
        bool operator!=(NVLogIter const& other) const
        {
            return !(*this == other);
        }
```

SOFTWARE APPENDIX

```
    NVLogIter& operator++( )
    {
        auto & entry = **this;
        m_offset += entry.size;
        return *this;
    }
  private:
    NVLog const& m_log;
    NVLog::log_offset_t m_offset;
};
NVLog::iterator NVLog::begin( )
{
    return NVLogIter(*this, 0);
}
NVLog::iterator NVLog::end( )
{
    return NVLogIter(*this, m_global_head);
}
int main( ) {
    auto t1 = std::chrono::high_resolution_clock::now( );
    std::cout << std::thread::hardware_concurrency( ) << " threads\n";
    try {
        using namespace boost::interprocess;
        file_mapping fm("logbuffer.dat", read_write);
        mapped_region region(fm, read_write);
        NVLog log(region.get_address( ), region.get_size( ));
        auto s = log.mk_stream( );
        auto t = log.mk_stream( );
        for(auto i = log.begin( ); i != log.end( ); ++i) {
            if((*i).next == -2) {
                std::cout << "hole\n";
            } else {
                std::cout << "blip\n";
            }
        }
        void *q = t.reserve(10);
        void *p = s.reserve(10);
        s.commit( );
    } catch (interprocess_exception const& e) {
        std::cout << "problems: " << e.what( ) << "\n";
    }
    auto t2 = std::chrono::high_resolution_clock::now( );
    std::cout <<
std::chrono::duration_cast<std::chrono::milliseconds>(t2 - t1)
                    .count( ) << " ms\n";
    return 0;
}
```

What is claimed is:

1. A computer-implemented method comprising:
   initiating a plurality of reserve and commit log operations in a database system, wherein the plurality of reserve operations comprise:
   filling, for each record, a header with a corresponding record size and a pointer for a previous log record for a corresponding client;
   updating, for each log record, the copy of the corresponding client descriptor in the transient data structure with an amount of reserved space and a pointer to a reserved record; and
   returning the reserved record to the corresponding client;
   logging at least a portion of the database operations in a log such that transient data structures are kept in-memory of the database system and persistent data structures are kept in byte-addressable memory; and
   registering each one or more clients concurrently accessing the log to enable such clients to access the log.

2. The method of claim 1, wherein the transient data structures are stored in dynamic random access memory (DRAM).

3. The method of claim 1, wherein the byte-addressable memory forms part of storage class memory (SCM).

4. The method of claim 1, wherein for each reserve operation, the database system returns a pointer to a log record having a requested size.

5. The method of claim 4, wherein subsequent to a client filling in records reserved via a reserve operation, for each commit operation, the database system makes the corresponding log records available in an order in which they were reserved.

6. The method of claim 1, wherein registration of the concurrent clients is limited so that they do not exceed a number of available hardware execution contexts.

7. The method of claim 1, wherein the persistent data structures comprise a contiguous buffer to hold log records in the log, a count of registered clients, and an array of client descriptors.

8. The method of claim 7, wherein each client descriptor comprises a pointer to a last committed log record for the corresponding client and a total amount of data committed by such client.

9. The method of claim 8, wherein the total amount of data committed by the client comprises a number of consumed bytes and/or cache lines.

10. The method of claim 7, wherein the transient data structures comprise a pointer to a first unused byte in the buffer and a copy of the client descriptors.

11. The method of claim 10, wherein as part of the operations and prior to commit, only the client descriptors in the transient data structures are modified and the corresponding copies of the client descriptors in the persistent data structures are modified upon commit.

12. The method of claim 1, wherein the log is characterized as clean if there are no registered clients, and wherein log records forming part of the log each comprise a header that indicates whether the corresponding log record was committed.

13. The method of claim 12, wherein the log is characterized as dirty if there are registered clients, and wherein each header of a dirty log record points to a previous log record for the corresponding client.

14. The method of claim 13, wherein the reserving operations comprise:
reserving a log entry by comparing and swapping a corresponding log tail.

15. The method of claim 1, wherein the committing operations comprise:
forcing client data to the persistent data structures.

16. The method of claim 1 further comprising:
initiating a restart operation by making committed log records available in an order in which they were reserved.

17. The method of claim 16 further comprising:
cleaning the log by identifying all holes in the log that comprise uncommitted data and writing headers for such holes that specify a size of the hotel and a marker indicating that the hole does not comprise committed data.

18. A system comprising:
at least one programmable data processor; and
memory storing instructions which, when executed by the at least one programmable data processor, result in operations comprising:
initiating a plurality of reserve and commit log operations in a database system, wherein the plurality of reserve operations comprise:
filling, for each record, a header with a corresponding record size and a pointer for a previous log record for a corresponding client;
updating, for each log record, the copy of the corresponding client descriptor in the transient data structure with an amount of reserved space and a pointer to a reserved record; and
returning the reserved record to the corresponding client;
logging at least a portion of the database operations in a log such that transient data structures are kept in-memory of the database system and persistent data structures are kept in byte-addressable memory; and
registering each of one or more clients concurrently accessing the log to enable such clients to access the log.

19. A non-transitory computer program product storing instructions which, when executed by at least one data processor forming part of at least one computing device, result in operations comprising:
initiating a plurality of reserve and commit log operations in a database system, wherein the plurality of reserve operations comprise:
filling, for each record, a header with a corresponding record size and a pointer for a previous log record for a corresponding client;
updating, for each log record, the copy of the corresponding client descriptor in the transient data structure with an amount of reserved space and a pointer to a reserved record; and
returning the reserved record to the corresponding client;
logging at least a portion of the database operations in a log such that transient data structures are kept in-memory of the database system and persistent data structures are kept in byte-addressable memory; and
registering each of at least two clients concurrently accessing the log to enable such at least two clients to access the log.

* * * * *